United States Patent
Liu

(10) Patent No.: US 12,280,577 B2
(45) Date of Patent: Apr. 22, 2025

(54) BONDING DEVICE

(71) Applicant: WUHAN CHINA STAR OPTOELECTRONICS TECHNOLOGY CO., LTD., Hubei (CN)

(72) Inventor: Biwu Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 35 days.

(21) Appl. No.: 18/458,836

(22) Filed: Aug. 30, 2023

(65) Prior Publication Data

US 2024/0149579 A1 May 9, 2024

(30) Foreign Application Priority Data

Nov. 8, 2022 (CN) .......................... 202211392320.7

(51) Int. Cl.
*B32B 37/10* (2006.01)
*B32B 37/00* (2006.01)

(52) U.S. Cl.
CPC ...... *B32B 37/1045* (2013.01); *B32B 37/0046* (2013.01)

(58) Field of Classification Search
CPC .. B32B 37/1045; B32B 37/0046; B29C 53/38
See application file for complete search history.

(56) References Cited

U.S. PATENT DOCUMENTS

2010/0043979 A1* 2/2010 Sleijpen ................. B32B 37/26
156/538

FOREIGN PATENT DOCUMENTS

JP WO2024021192 A1 * 2/2014

OTHER PUBLICATIONS

WO2014021192A1 Machine Translation of Description (Year: 2024).*

* cited by examiner

*Primary Examiner* — Cynthia L Schaller
(74) *Attorney, Agent, or Firm* — HSML P. C.

(57) ABSTRACT

The embodiment of the present invention discloses a bonding device. The bonding device includes a main body and a lamination part connected to the main body. The lamination part is configured to press and bond an adhesive layer to an apparatus to be bonded, and includes a lamination main portion and a squeeze sub-portion connected to the lamination main portion. Along a lamination direction perpendicular to the lamination part, a width of the squeeze sub-portion is less than a width of the lamination main portion. The present invention, by using the squeeze sub-portion of the lamination part with a smaller width, more conveniently squeezes and bonds the adhesive layer, which facilitates mechanized bonding, improves a bonding efficiency, and reduces a labor cost while guaranteeing a bonding effect.

16 Claims, 10 Drawing Sheets

BONDING DEVICE

CROSS-REFERENCE TO RELATED APPLICATION

The present invention claims a priority of a Chinese patent application No. 202211392320.7, titled "BONDING DEVICE", filed with the China National Intellectual Property Administration (CNIPA) on Nov. 8, 2022, in which all contents of the aforementioned application are incorporated in the present invention by reference.

FIELD OF INVENTION

The present invention relates to a field of display bonding, especially to a bonding device.

BACKGROUND OF INVENTION

In recent years, display module manufacturers have been placing increasingly higher demands on the production cost and efficiency of display modules. During the process of manufacturing display modules, bonding of an adhesive layer, such as a light shielding adhesive, is required. However, for adhesive layer attachment at locations with step differences, manual squeezing and bonding by hand, for instance using handheld cotton swabs to squeeze, is often necessary. This manual process is characterized by low efficiency and high labor costs, consequently reducing the overall efficiency of the display module production and increasing costs.

As a result, there is a pressing need for a bonding device to solve the aforementioned technical issue.

SUMMARY OF INVENTION

The present invention provides a bonding device that can mitigate a technical issue of high costs and low efficiency of bonding an adhesive layer for a conventional display module.

The present invention provides a bonding device, comprising:
 a main body; and
 a lamination part connected to the main body and configured to press and bond an adhesive layer to an apparatus to be bonded;
 wherein the lamination part comprises a lamination main portion and a squeeze sub-portion connected to the lamination main portion, along a lamination direction perpendicular to the lamination part, and a width of the squeeze sub-portion is less than a width of the lamination main portion.

Preferably, the squeeze sub-portion comprises a flexible body and a connector connecting the flexible body and the lamination main portion, and the flexible body is disposed around an end of a side of the connector away from the lamination main portion; and an elastic modulus of the flexible body is less than an elastic modulus of the connector.

Preferably, the flexible body comprises a first portion and a second portion disposed oppositely, and an elastic modulus of the first portion is different from an elastic modulus of the second portion.

Preferably, the flexible body comprises a third portion and a fourth portion, the third portion is disposed on a side surface of an end portion of the connector, and the fourth portion is disposed on an end surface of an end portion of the connector; and a thickness of the third portion is less than a thickness of the fourth portion.

Preferably, an outer surface of a side of the flexible body away from the connector is a spherical surface.

Preferably, the flexible body comprises a cavity, and the connector comprises a first via hole communicating with the cavity; the bonding device further comprises a pneumatic part; and the pneumatic part communicates with the cavity through the first via hole.

Preferably, the flexible body comprises a first sidewall and a second sidewall corresponding to the cavity, the first sidewall is located on a side of the second sidewall away from the connector; and an elastic modulus of the first sidewall is less than an elastic modulus of the second sidewall.

Preferably, the bonding device further comprises: an attaching part connected to the main body and comprising a roller portion configured to align and bond the adhesive layer to the apparatus to be bonded; and an alignment inspection part connected to the attaching part and comprising an optical inspection part configured to inspect an alignment bonding position of the adhesive layer and the apparatus to be bonded.

Preferably, a coverage inspection part configured to inspect a coverage of the squeeze sub-portion to the adhesive layer.

Preferably, the bonding device further comprises a pressure inspection part connected to the lamination part.

The present invention also provides a bonding device, comprising:
 a main body;
 a lamination part connected to the main body and configured to press and bond an adhesive layer to an apparatus to be bonded; and
 an attaching part connected to the main body and comprising a roller portion configured to align and bond the adhesive layer to the apparatus to be bonded;
 wherein the lamination part comprises a lamination main portion and a squeeze sub-portion connected to the lamination main portion, and along a lamination direction perpendicular to the lamination part, and a width of the squeeze sub-portion is less than a width of the lamination main portion.

Preferably, the squeeze sub-portion comprises a flexible body and a connector connecting the flexible body and the lamination main portion, and the flexible body is disposed around an end of a side of the connector away from the lamination main portion; and
 an elastic modulus of the flexible body is less than an elastic modulus of the connector.

Preferably, the flexible body comprises a first portion and a second portion disposed oppositely, and an elastic modulus of the first portion is different from an elastic modulus of the second portion.

Preferably, the flexible body comprises a third portion and a fourth portion, the third portion is disposed on a side surface of an end portion of the connector, and the fourth portion is disposed on an end surface of an end portion of the connector; and
 a thickness of the third portion is less than a thickness of the fourth portion.

Preferably, an outer surface of a side of the flexible body away from the connector is a spherical surface.

Preferably, the flexible body comprises a cavity, and the connector comprises a first via hole communicating with the cavity;

the bonding device further comprises a pneumatic part; and the pneumatic part communicates with the cavity through the first via hole.

Preferably, the flexible body comprises a first sidewall and a second sidewall corresponding to the cavity, the first sidewall is located on a side of the second sidewall away from the connector; and an elastic modulus of the first sidewall is less than an elastic modulus of the second sidewall.

Preferably, the bonding device further comprises a coverage inspection part configured to inspect a coverage of the squeeze sub-portion to the adhesive layer.

Preferably, the bonding device further comprises a pressure inspection part connected to the lamination part.

Preferably, the bonding device further comprises an alignment inspection part connected to the attaching part and comprising an optical inspection part configured to inspect an alignment bonding position of the adhesive layer and the apparatus to be bonded.

Advantages of the present invention: The present invention, by using the squeeze sub-portion of the lamination part with a smaller width, more conveniently squeezes and bonds the adhesive layer, which facilitates mechanized bonding, improves a bonding efficiency and reduces a labor cost while guaranteeing a bonding effect.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DETAILED DESCRIPTION OF PREFERRED EMBODIMENTS

Figure 1:
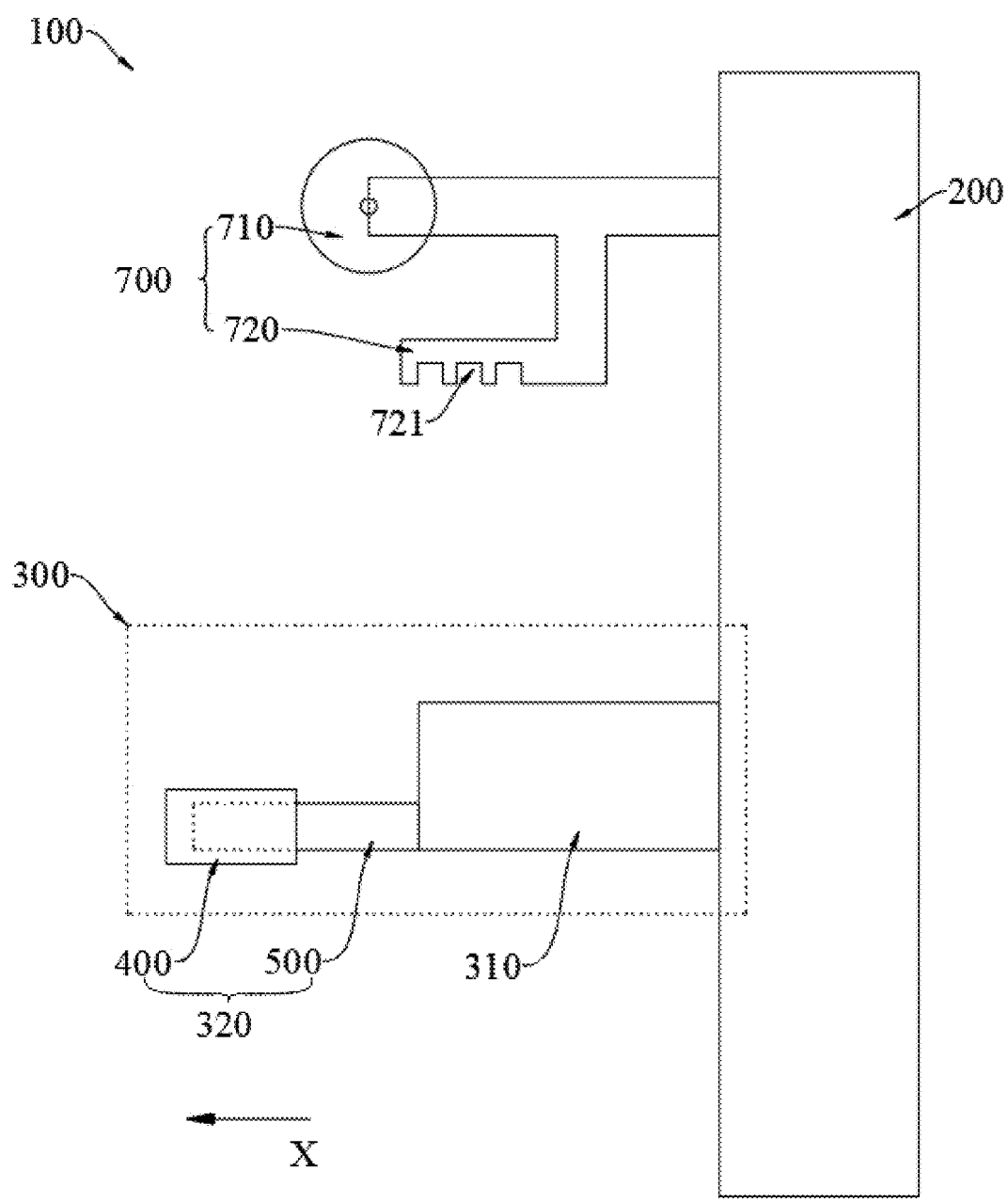
FIG. 1 is a schematic structural view of a first structure of a bonding device provided by an embodiment of the present invention.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as "upper" and "lower", when not specified to the contrary explanation, usually refer to the upper and lower states of the device in actual use or working conditions, specifically according to the direction of the figures in the drawings. Furthermore, "inner" and "outer" refer to the outline of the device.

In recent years, display module manufacturers have been placing increasingly higher demands on the production cost and efficiency of display modules. During the process of manufacturing display modules, bonding of an adhesive layer, such as a light shielding adhesive, is required. However, for adhesive layer attachment at locations with step differences, manual squeezing and bonding by hand, for instance using handheld cotton swabs to squeeze, is often necessary. This manual process is characterized by low efficiency and high labor costs, consequently reducing the overall efficiency of the display module production and increasing costs.

With reference to FIGS. 1 to 8, the embodiment of the present invention provides a bonding device 100, comprising:

a main body 200;
a lamination part 300 connected to the main body 200 and configured to press and bond an adhesive layer 10 to an apparatus to be bonded 20;
wherein the lamination part 300 comprises a lamination main portion 310 and a squeeze sub-portion 320 connected to the lamination main portion 310, and along the lamination direction perpendicular to the lamination part 300, a width of the squeeze sub-portion 320 is less than a width of the lamination main portion 310.

The present invention, by using the squeeze sub-portion 320 of the lamination part 300 with a smaller width, more conveniently squeezes and bonds the adhesive layer 10, which facilitates mechanized bonding, improves a bonding efficiency and reduces a labor cost while guaranteeing a bonding effect.

Now, technical solutions of the present invention are described in combination with specific embodiments.

In the present embodiment, with reference to FIG. 1, the bonding device 100 comprises a main body 200 and a lamination part 300 configured to press and bond the adhesive layer 10 to the apparatus to be bonded 20. The lamination part 300 is connected to the main body 200. The lamination part 300 comprises a lamination main portion 310 and a squeeze sub-portion 320 connected to the lamination main portion 310. Along a lamination direction perpendicular to the lamination part 300, a width of the squeeze sub-portion 320 is less than a width of the lamination main portion 310.

A lamination direction of the lamination part 300 is indicated by "X". A tape bonding apparatus being a display module is used as an example, the display module can be a liquid crystal display module, and can be a self-luminous display module. To facilitate description, the present specification uses a liquid crystal display module as an example for explanation. The display module comprises a liquid crystal display panel 21 and a backlight module 22 and a cover plate 23 located on two sides of the liquid crystal display panel 21 respectively. In general, an end portion of the liquid crystal display panel 21 is retracted relative to the backlight module 22 and the cover plate 23. An end portion step difference is formed between the liquid crystal display panel 21 and the cover plate 23, and an end portion step difference is formed between the liquid crystal display panel 21 and the backlight module 22. Therefore, during bonding the light shielding adhesive, bonding an end portion of the liquid crystal display panel 21 requires manual press.

Figure 8:
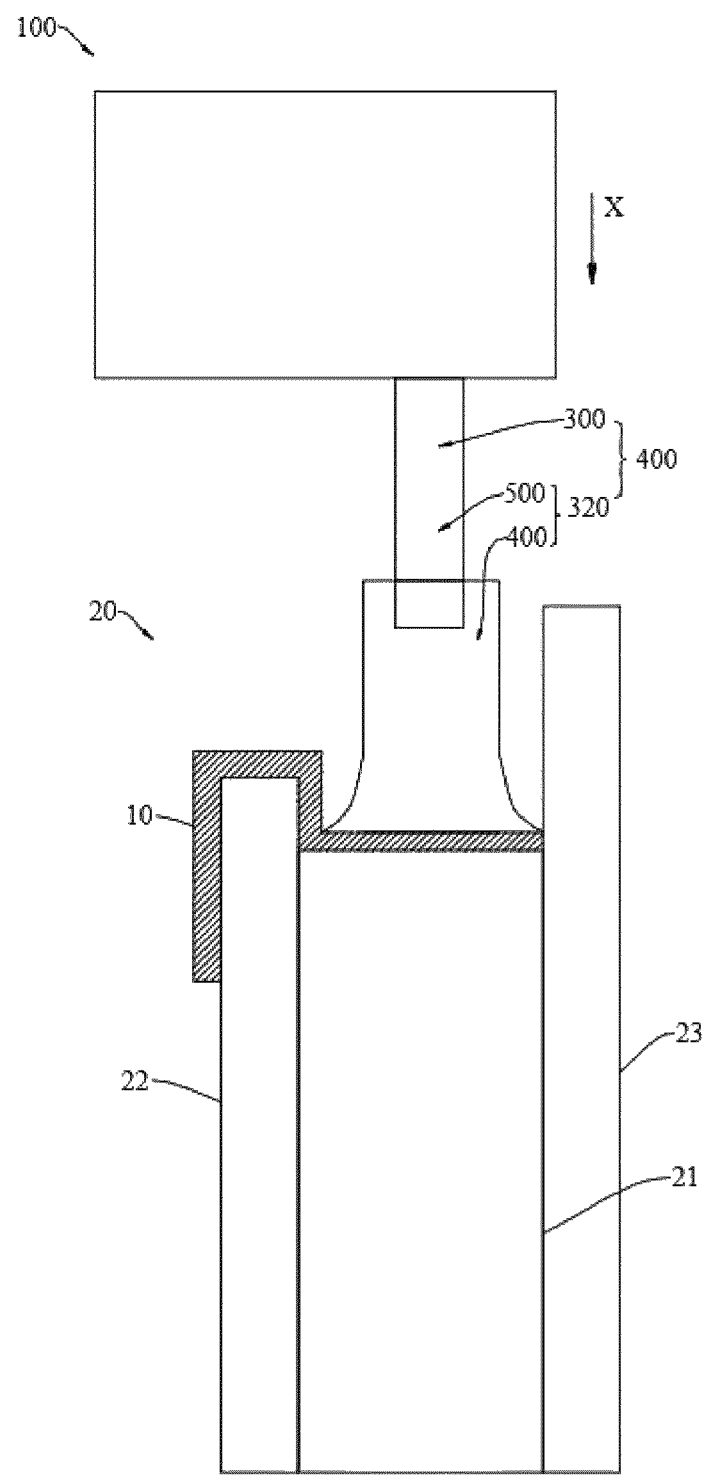
FIG. 8 is a schematic view of a bonding principle of the bonding device provided by the embodiment of the present invention.

The squeeze sub-portion 320 of the lamination part 300 is set to have a shape of a smaller width, as shown in FIG. 8, to facilitate the squeeze sub-portion 320 deeply entering the end portion step difference between the liquid crystal display panel 21 and the cover plate 23 and the end portion step difference between the liquid crystal display panel 21 and the backlight module 22, which advantages squeezing and bonding the light shielding adhesive, improves the bonding effect of the light shielding adhesive, and prevents light leak or bonding failure. Also, the bonding device 100 can be used for automatic bonding to reduce the labor cost and lower a total production cost.

In some embodiments, generally, material of the lamination part 300 is hard material. during squeezing and bonding the adhesive layer 10, the lamination part 300 easily has a risk scratching the backlight module 22 or the cover plate 23.

With reference to FIG. 1, the squeeze sub-portion 320 comprises a flexible body 400 and a connector 500 connecting the flexible body 400 to the lamination main portion 310. The flexible body 400 is disposed around an end portion of a side of the connector 500 away from the lamination main portion 310. An elastic modulus of the flexible body 400 is less than an elastic modulus of the connector 500.

The elastic modulus of the flexible body 400 is less than the elastic modulus of the connector 500 such that a buffer function is applied between the connector 500 and the apparatus to be bonded 20 to reduce a risk of the lamination part 300 scratching the apparatus to be bonded 20 during squeezing and bonding the adhesive layer 10 to protect the apparatus to be bonded 20.

Also, the flexible body 400 deforms during squeezing to cover more of the light shielding adhesive such that the light shielding adhesive is squeezed to be bonded tightly to the tape bonding apparatus, which improves the bonding effect.

In some embodiments, the end portion step difference between the liquid crystal display panel 21 and the cover plate 23, and the end portion step difference between the liquid crystal display panel 21 and the backlight module 22 are used as an example, during bonding the light shielding adhesive, the light shielding adhesive would not fully cover the two end portion step differences. Generally, the light shielding adhesive would be bonded to the backlight module 22 first, and then squeezing bonding is implemented. An amount of the light shielding adhesive required for the bonding between the liquid crystal display panel 21 and the cover plate 23 is less, and it should be noticed not to scratch the cover plate 23 during performing squeezing between the liquid crystal display panel 21 and the cover plate 23. However, a amount of the light shielding adhesive required for the bonding between the liquid crystal display panel 21 and the backlight module 22 is greater, and more powerful squeezing is required to deform the flexible body 400 during squeezing to cover more of the light shielding adhesive to squeeze the light shielding adhesive to be bonded tightly to the tape bonding apparatus to improve the bonding effect.

Figure 2:
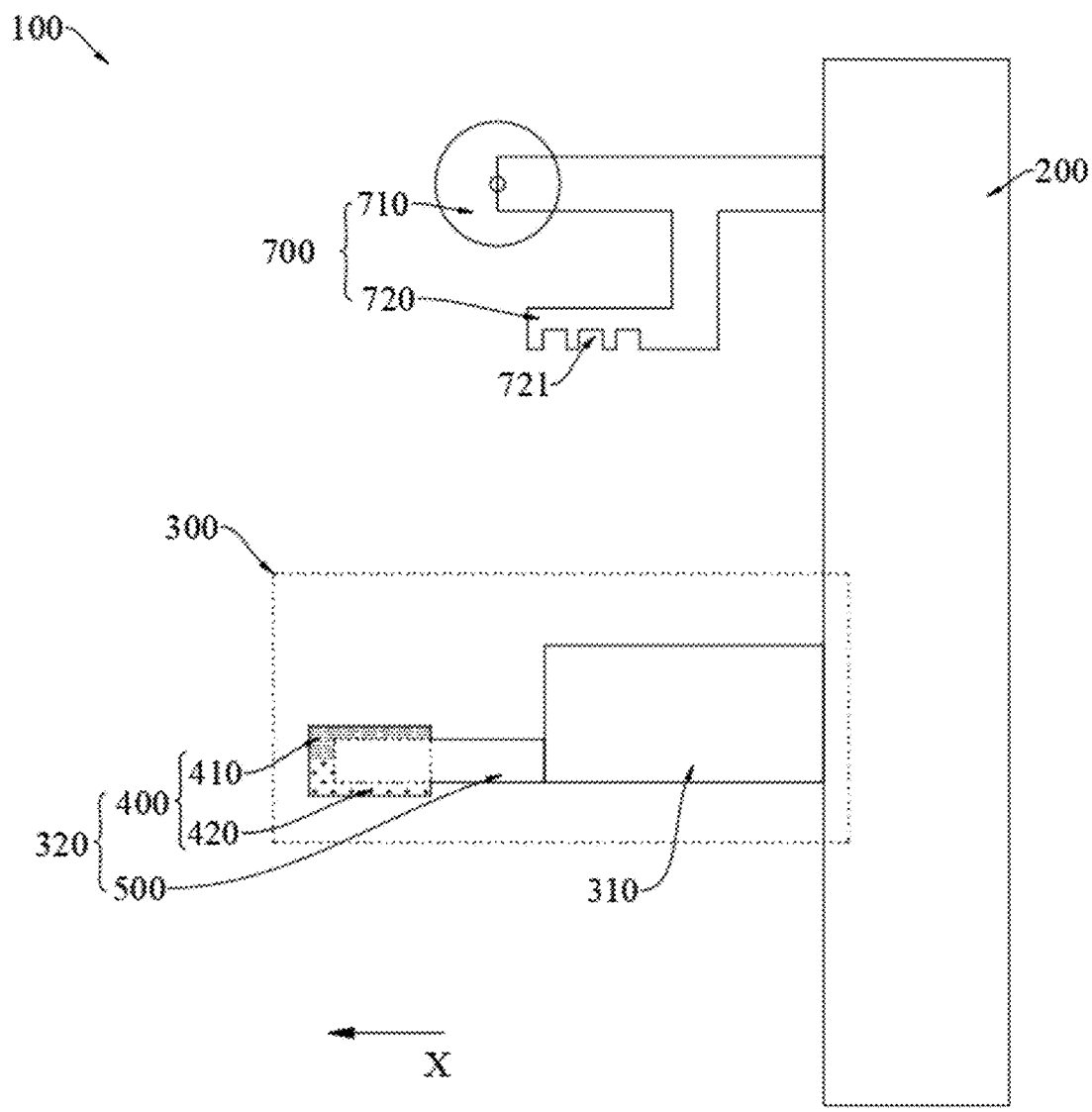
FIG. 2 is a schematic structural view of a second structure of the bonding device provided by the embodiment of the present invention.

With reference to FIG. 2, the flexible body 400 comprises a first portion 410 and a second portion 420 disposed oppositely. An elastic modulus of the first portion 410 is different from an elastic modulus of the second portion 420.

The elastic modulus of the first portion 410 being greater than the elastic modulus of the second portion 420 is used as an example, during bonding the light shielding adhesive, the first portion 410 can be bonded to a side of the liquid crystal display panel 21 and the backlight module 22, and the second portion 420 can be bonded to a side of the liquid crystal display panel 21 and the cover plate 23. The first portion 410 can apply a more direct force to the light shielding adhesive between the liquid crystal display panel 21 and the backlight module 22. The second portion 420 can better prevent the lamination part 300 from scratching the cover plate 23.

In some embodiments, when the flexible body 400 is squeezed, deformation of the flexible body 400 can be applied to the light shielding adhesive to drive the light shielding adhesive to be bonded better tightly to the apparatus to be bonded 20.

Figure 3:
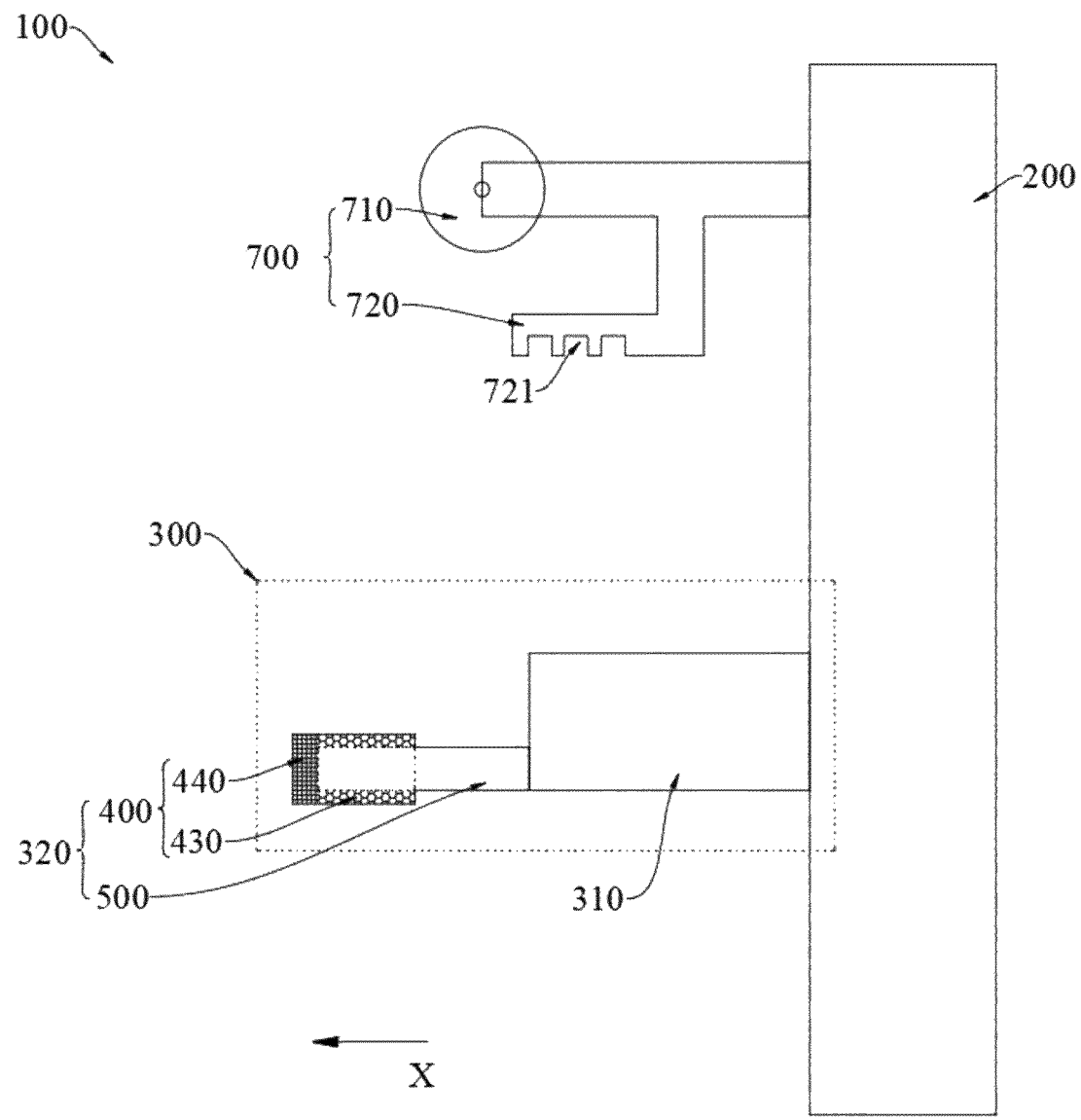
FIG. 3 is a schematic structural view of a third structure of the bonding device provided by the embodiment of the present invention.

With reference to FIG. 3, the flexible body 400 comprises a third portion 430 and a fourth portion 440, the third portion 430 is disposed on a side surface of an end portion of the connector 500, the fourth portion 440 is disposed on an end surface of an end portion of the connector 500. A thickness of the third portion 430 is less than a thickness of the fourth portion 440.

Generally, a squeezing direction of the lamination part 300 is a direction from the lamination main portion 310 to the squeeze sub-portion 320. A thickness of the fourth portion 440 is greater. When the flexible body 400 of the squeeze sub-portion 320 is squeezed, the fourth portion 440 deforms more easily, and the fourth portion 440 with the greater thickness facilitates greater deformation to perform squeezing and bonding to the surrounding light shielding adhesive and improve the bonding effect.

Figure 4:
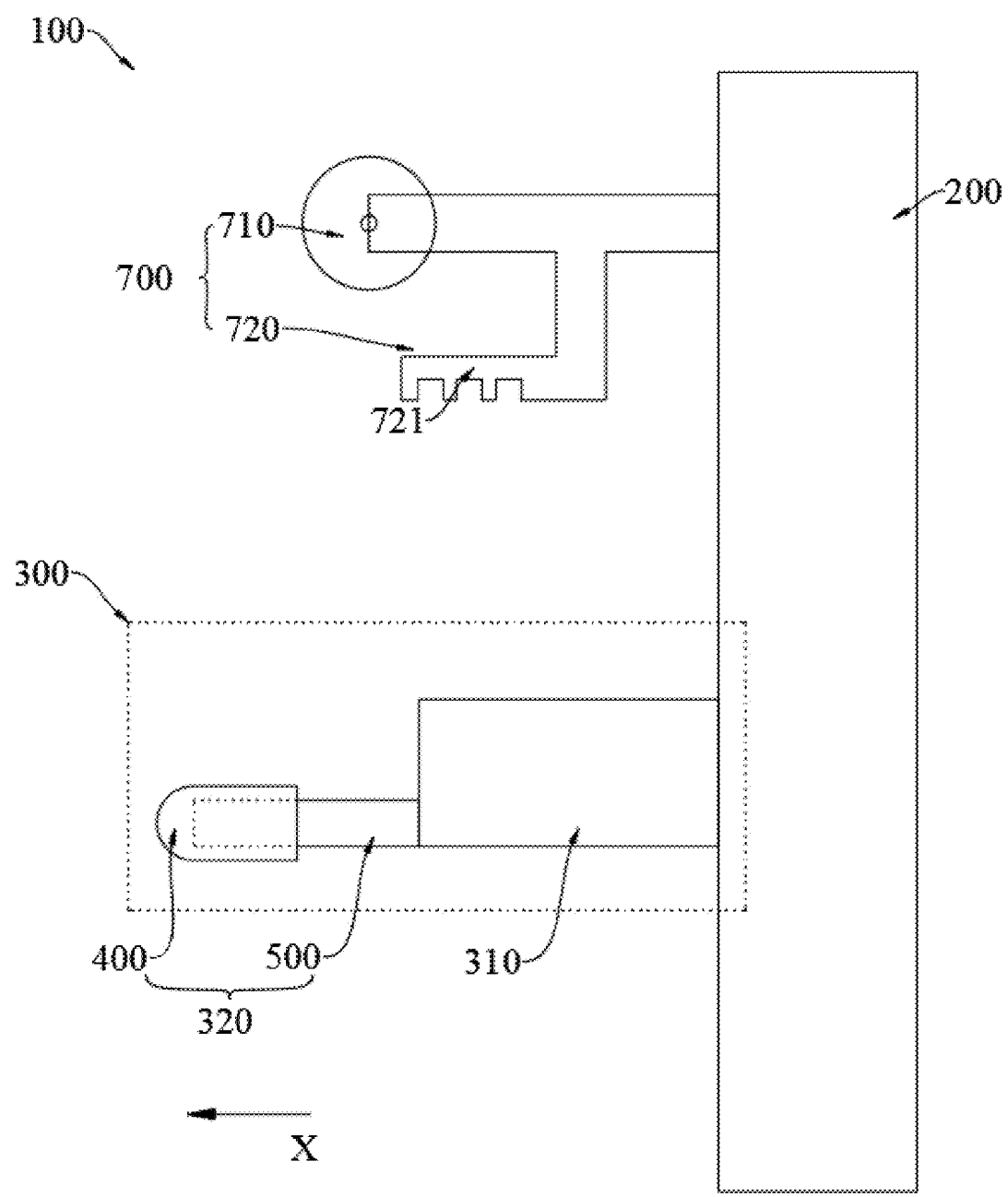
FIG. 4 is a schematic structural view of a fourth structure of the bonding device provided by the embodiment of the present invention.

In some embodiments, with reference to FIG. 4, an outer surface of a side of the flexible body 400 away from the connector 500 is a spherical surface. The flexible body 400 with the spherical surface have more uniform periphery extensibility, and can provide a uniform periphery bonding force in a scenario requiring uniform periphery bonding to improve uniformity of bonding and improve the bonding effect.

Figure 5:
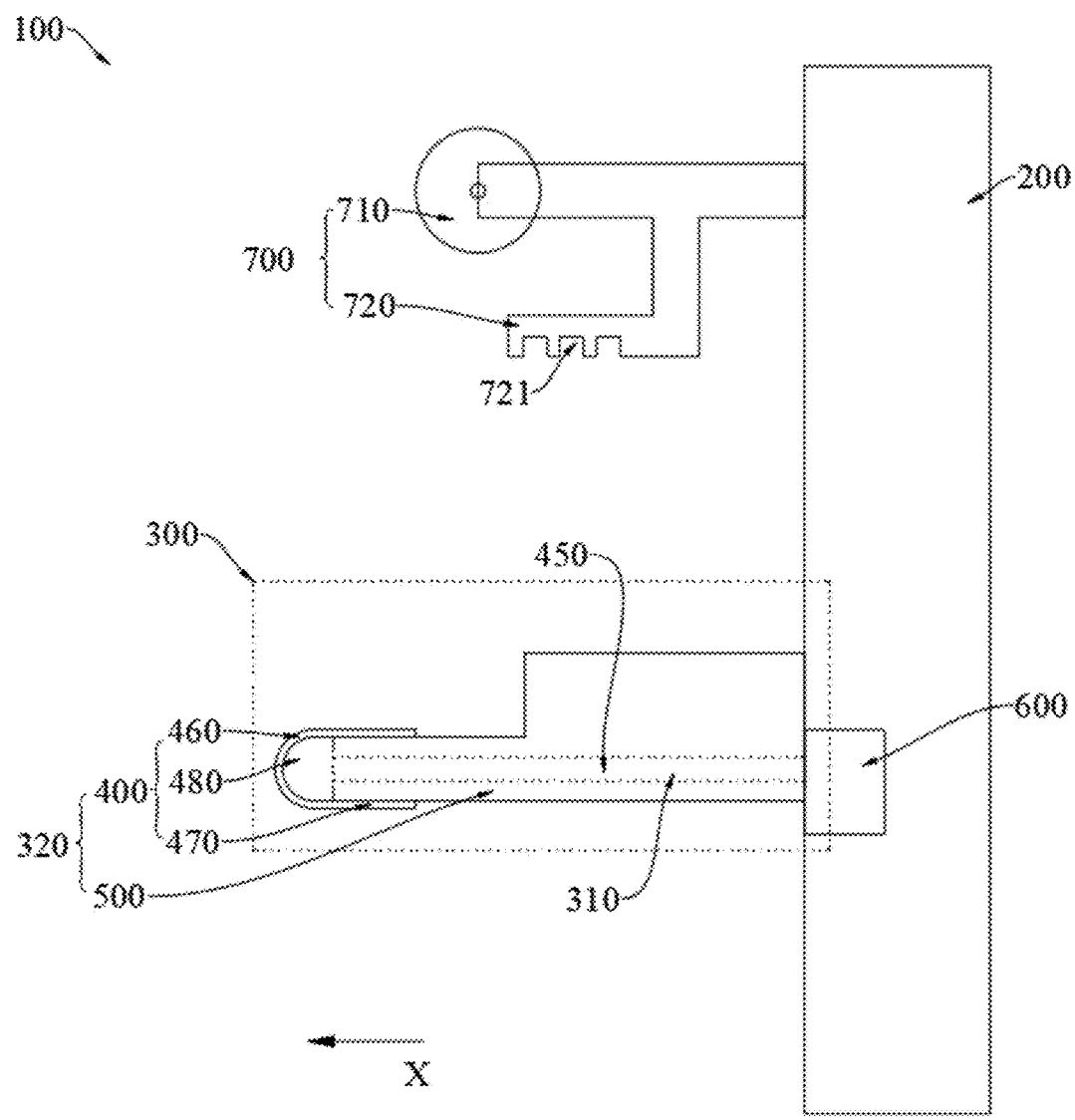
FIG. 5 is a schematic structural view of a fifth structure of the bonding device provided by the embodiment of the present invention.

In some embodiments, with reference to FIG. 5, the flexible body 400 comprises a cavity 480, the connector 500 comprises a first via hole 450, and the first via hole 450 communicates with the cavity 480. The bonding device 100 further comprises pneumatic part 600. The pneumatic part 600 communicates with the cavity 480 through the first via hole 450.

A squeezing principle of the squeeze sub-portion 320 can be pneumatic squeezing that pressurizes the first via hole 450 through the pneumatic part 600 to inflate and expand the cavity 480 to further expand the flexible body 400 to squeeze the light shielding adhesive for bonding. The principle is similar to inflation and expansion of a balloon to mitigate direct squeezing of the hard material of the connector 500, and elastic material is used for squeezing and bonding to protect the adhesive layer 10 and the tape bonding apparatus.

In some embodiments, with reference to FIG. 5, the flexible body 400 comprises a first sidewall 460 and a second sidewall 470 corresponding to the cavity 480. The first sidewall 460 is located on a side of the second sidewall 470 away from the connector 50. An elastic modulus of the first sidewall 460 is less than an elastic modulus of the second sidewall 470.

The first sidewall 460 is nearer an end of the cavity 480 away from connector 500, an elastic modulus of the first cavity 480 is smaller to more facilitate expansion to provide the adhesive layer 10 with a better bonding pressure, increase a bonding efficiency, and improve the bonding effect.

Figure 7:
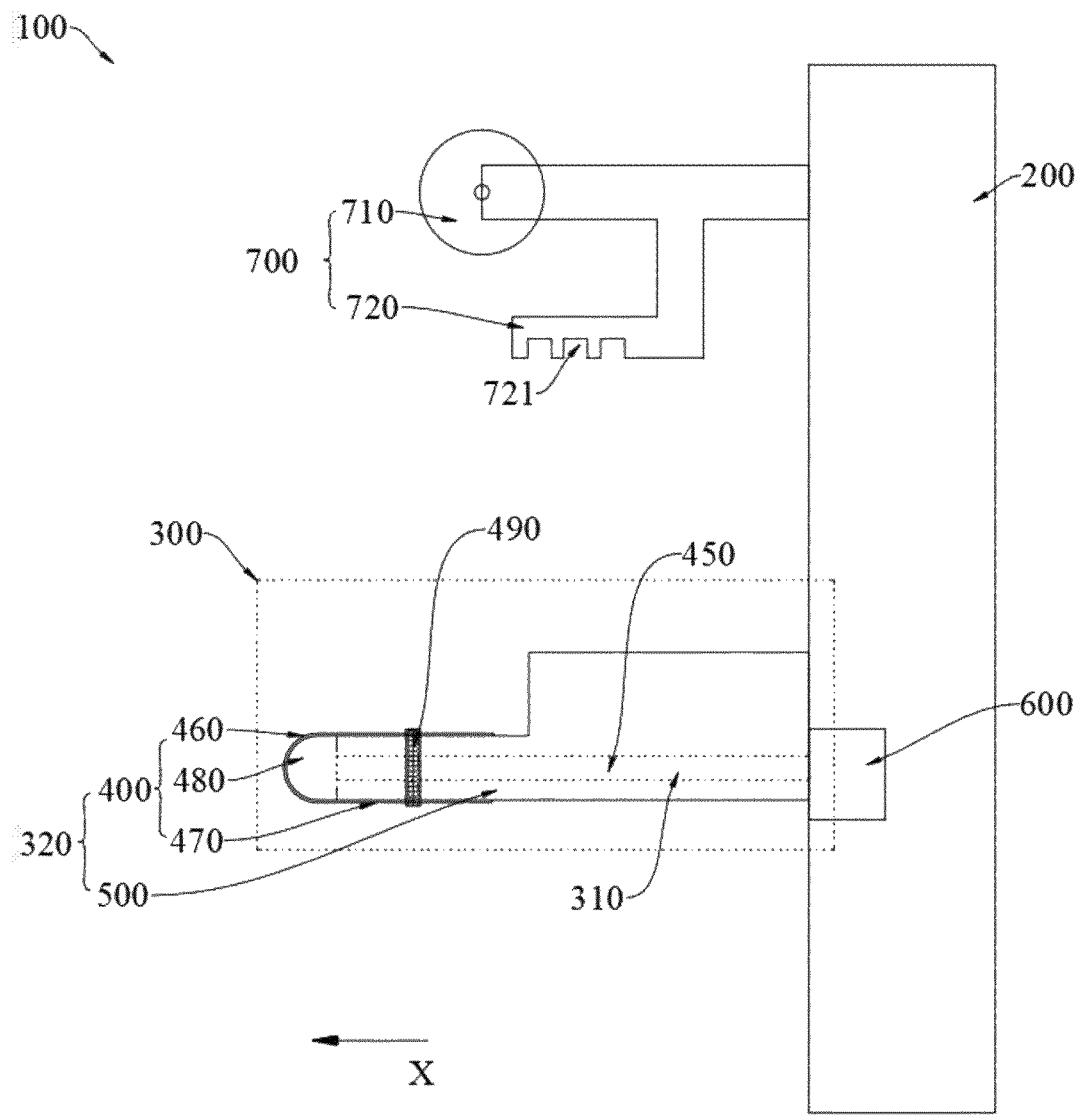
FIG. 7 is a schematic structural view of a seventh structure of the bonding device provided by the embodiment of the present invention.

In some embodiments, with reference to FIG. 7, the lamination part 300 further comprises a fastening portion 490, the fastening portion 490 corresponds to the second sidewall 470 and is configured to fasten the second sidewall 470 to prevent the second sidewall 470 from falling off.

In some embodiments, with reference to FIG. 1, the bonding device 100 further comprises an attaching part 700 and an alignment inspection part 800. The attaching part 700 is connected to the main body 200. The attaching part 700 comprises a roller portion 710 configured to align and bond the adhesive layer 10 with the apparatus to be bonded 20. The alignment inspection part 800 is connected to the attaching part 700. The alignment inspection part 800 comprises an optical inspection part configured to inspect an alignment bonding position of the adhesive layer 10 and the apparatus to be bonded 20.

During bonding the adhesive layer 10, the attaching part 700 attaches the adhesive layer 10 to a corresponding point position of the apparatus to be bonded 20 first, and then performs a rolling attachment by the roller portion 710. The alignment inspection part 800 can automatically inspect the alignment bonding position between the adhesive layer 10 and the apparatus to be bonded 20 to increase accuracy of alignment bonding point position and improve the attachment effect.

In some embodiments, with reference to FIG. 1, the attaching part 700 further comprises a pick-up portion 720 configured to pick up the adhesive layer 10. The pick-up portion 720 comprises a vacuum suction sub-portion 721. The vacuum suction sub-portion 721 is connected to a vacuum pump and is configured to generate a vacuum negative pressure between the vacuum suction sub-portion 721 and the adhesive layer 10 to pick up the adhesive layer 10.

Figure 6:
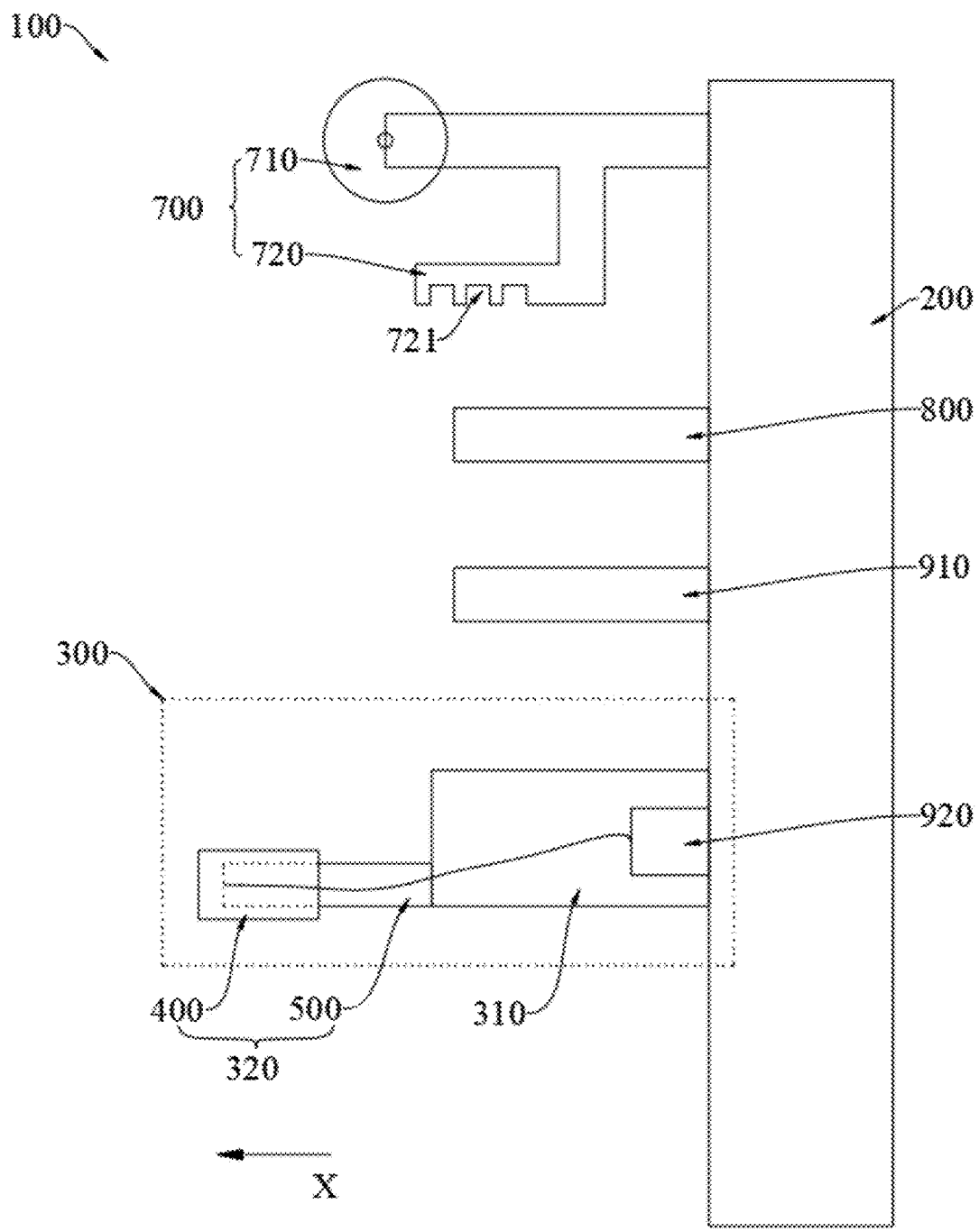
FIG. 6 is a schematic structural view of a sixth structure of the bonding device provided by the embodiment of the present invention.

In some embodiments, with reference to FIG. 6, the bonding device 100 further comprises a coverage inspection part 910 configured to inspect a coverage of the squeeze sub-portion 320 to the adhesive layer 10. the coverage inspection part 910 can comprise a high-precision charge-coupled element, for example, a high power microscope.

In some embodiments, with reference to FIG. 6, the bonding device 100 further comprises a pressure inspection part 920 connected to the lamination part 300. The pressure inspection part 920 is configured to inspect a pressure applied to the squeeze sub-portion 320 along the lamination direction of the lamination part 300.

With reference to FIG. 8, when the adhesive layer 10 is squeezed and bonded, the coverage of the squeeze sub-portion 320 to the adhesive layer 10 is strongly relevant to bonding effect, and the coverage of the squeeze sub-portion 320 to the adhesive layer 10 is also relevant to the amount of deformation of the flexible portion and a squeezing force of the squeeze sub-portion 320. Therefore, a test is performed. Influence of the coverage of the squeeze sub-portion 320 on the adhesive layer 10 to the bonding effect is listed in Table 1. Influence of an amount of deformation of the flexible portion on a bonding surface to the bonding effect is listed in Table 2. Influence of an excess coverage of the squeeze sub-portion 320 on the adhesive layer 10 to the bonding effect is listed in Table 3. A relationship among the squeezing force of the squeeze sub-portion 320, the amount of deformation, and the coverage of the flexible portion is as shown in Table 4. Material of the flexible portion can be silicone or PV glue. A distance between a surface of a side of the backlight module 22 near the cover plate 23 and a surface of a side of the cover plate 23 near the backlight module 22 refers to L, L generally ranges from 0.43 mm to 0.58 mm. Here L is set as 0.48 mm. Along the lamination direction perpendicular to the lamination part 300, a width of the flexible portion is 0.3 mm.

TABLE 1

| Coverage/% | 70 | 75 | 80 | 85 | 90 | 95 | 100 |
|---|---|---|---|---|---|---|---|
| Number of inputs/pcs | 100 | 200 | 500 | 1000 | 1000 | 1000 | 1000 |
| Light leak defective rate/% | 2 | 1 | 0.4 | 0.3 | 0.1 | 0.1 | 0.2 |
| Warpage defective rate/% | 3 | 2 | 0.6 | 0.4 | 0.2 | 0.1 | 0 |
| Effect | Poor | Poor | Normal | Normal | Excellent | Excellent | Excellent |

TABLE 2

| Amount of deformation/mm | 0.15 | 0.18 | 0.21 | 0.23 | 0.25 | 0.26 | 0.27 |
|---|---|---|---|---|---|---|---|
| number of inputs/pcs | 200 | 200 | 200 | 200 | 500 | 200 | 200 |
| Backlight peeling defective rate/% | 0 | 0 | 0 | 0 | 0 | 1 | 5 |
| Effect | Excellent | Excellent | Excellent | Excellent | Excellent | Poor | Poor |

TABLE 3

| Coverage/% | 100 | 106 | 110 | 115 | 117 | 119 | 200 |
|---|---|---|---|---|---|---|---|
| Number of inputs/pcs | 200 | 200 | 200 | 200 | 200 | 200 | 200 |
| the cover plate 23 scratch defective rate/% | 0 | 0 | 0 | 0 | 0 | 0 | 0 |
| Dyne pen test(32B) | 0 | 0 | 0 | 0 | 0 | 0 | 0 |
| Effect | Excellent | Excellent | Excellent | Excellent | Excellent | Excellent | Excellent |

TABLE 4

| Pressure/MPa | Flexible portion before compression/mm | Flexible portion after compression/mm | Amount of deformation/mm | coverage/% |
|---|---|---|---|---|
| 0.03 | 0.3 | 0.34 | 0.04 | 71 |
| 0.06 | 0.3 | 0.38 | 0.08 | 79 |
| 0.09 | 0.3 | 0.42 | 0.11 | 88 |
| 0.12 | 0.3 | 0.45 | 0.15 | 94 |
| 0.15 | 0.3 | 0.48 | 0.18 | 100 |
| 0.18 | 0.3 | 0.51 | 0.21 | 106 |
| 0.21 | 0.3 | 0.53 | 0.23 | 110 |
| 0.24 | 0.3 | 0.35 | 0.25 | 115 |
| 0.27 | 0.3 | 0.56 | 0.26 | 117 |
| 0.30 | 0.3 | 0.57 | 0.27 | 119 |

With reference to Table 1, the light leak defective rate indicates a bonding effect to a light shielding adhesive of the backlight module 22, and the warpage defective rate indicates an edge warpage degree of a contact between the light shielding adhesive and the display module. Therefore, when the coverage of the squeeze sub-portion 320 on the adhesive layer 10 is greater than 90%, both the light leak defective rate and the warpage defective rate are less than 0.2%, and the bonding effect reaches the standard.

With reference to Table 2, a machine No. J19S is used as an example, when an amount of deformation of the flexible portion on a bonding surface is greater than or equal to 0.26 mm, the backlight module 22 has a risk of peeling-off. Therefore, the amount of deformation of the flexible portion on the bonding surface should be less than or equal to 0.25 mm to make the bonding effect reach the standard.

With reference to Table table 3, when a coverage of the squeeze sub-portion 320 on the adhesive layer 10 is greater than 100%, no risk of scratch to the cover plate 23.

With reference to Table 4, material of the flexible portion being silicone is used as an example, a coverage of the squeeze sub-portion 320 on the adhesive layer 10 is required to be greater than or equal to 90%. Therefore, a pressure is required to be greater than or equal to 0.1 MPa. An amount of deformation of the flexible portion on the bonding surface needs to be less than or equal to 0.25 mm. Therefore, a pressure is required to be less than or equal to 0.24 MPa.

The present invention, by using the squeeze sub-portion 320 of the lamination part 300 with a smaller width, more conveniently squeezes and bonds the adhesive layer 10, which facilitates mechanized bonding, improves a bonding efficiency and reduces a labor cost while guaranteeing a bonding effect.

The embodiment of the present invention also provides an apparatus bonding method, the apparatus bonding method utilizes any one of the above bonding devices 100, and the apparatus bonding method comprises steps as follows:

A step S100 comprises providing an apparatus to be bonded 20.

A step S200 comprises providing an adhesive layer 10.

A step S300 comprises bonding the adhesive layer 10 to a corresponding portion of the apparatus to be bonded 20 by the attaching part 700 of the bonding device 100.

A step S400 comprises squeezing a first position of the adhesive layer 10 by the squeeze sub-portion 320 of the bonding device 100.

The present invention, by using the squeeze sub-portion 320 of the lamination part 300 with a smaller width, more conveniently squeezes and bonds the adhesive layer 10, which facilitates mechanized bonding, improves a bonding efficiency and reduces a labor cost while guaranteeing a bonding effect.

Now, technical solutions of the present invention are described in combination with specific embodiments.

In the present embodiment, the apparatus bonding method comprises steps as follows:

A step S100 comprises providing an apparatus to be bonded 20.

In some embodiments, the apparatus to be bonded 20, using a liquid crystal display module as an example, comprises a the liquid crystal display panel 21 and the backlight module 22 and a the cover plate 23 located on two sides of the liquid crystal display panel 21 respectively.

A step S200 comprises providing an adhesive layer 10.

In some embodiments, the adhesive layer 10 uses a light shielding adhesive as an example.

A step S300 comprises bonding the adhesive layer 10 to a corresponding portion of the apparatus to be bonded 20 by the attaching part 700 of the bonding device 100.

In some embodiments, the attaching part 700 further included by the bonding device 100 is connected to the main body 200. The attaching part 700 comprises a roller portion 710 configured to align and bond the adhesive layer 10 to the apparatus to be bonded 20.

In some embodiments, the step S300 comprises:

a step S310 comprising bonding the adhesive layer 10 to a corresponding portion of the apparatus to be bonded 20 by the attaching part 700 of the bonding device 100, and implementing an alignment inspection by the alignment inspection part 800.

In some embodiments, the bonding device 100 further comprises an alignment inspection part 800, the alignment inspection part 800 is connected to the attaching part 700, and the alignment inspection part 800 comprises an optical inspection part configured to inspect an alignment bonding position of the adhesive layer 10 and the apparatus to be bonded 20.

During bonding the adhesive layer 10, the attaching part 700 attaches the adhesive layer 10 to a corresponding point position of the apparatus to be bonded 20 first, and then performs a rolling attachment by the roller portion 710. The alignment inspection part 800 can automatically inspect the alignment bonding position between the adhesive layer 10 and the apparatus to be bonded 20 to increase accuracy of alignment bonding point position and improve the attachment effect.

A step S400 comprises squeezing the first position of the adhesive layer 10 by the squeeze sub-portion 320 of the bonding device 100.

In some embodiments, a squeezing method of the squeeze sub-portion 320 of the bonding device 100 to the adhesive layer 10 can be a vertical bonding or a lateral bonding.

Figure 9:
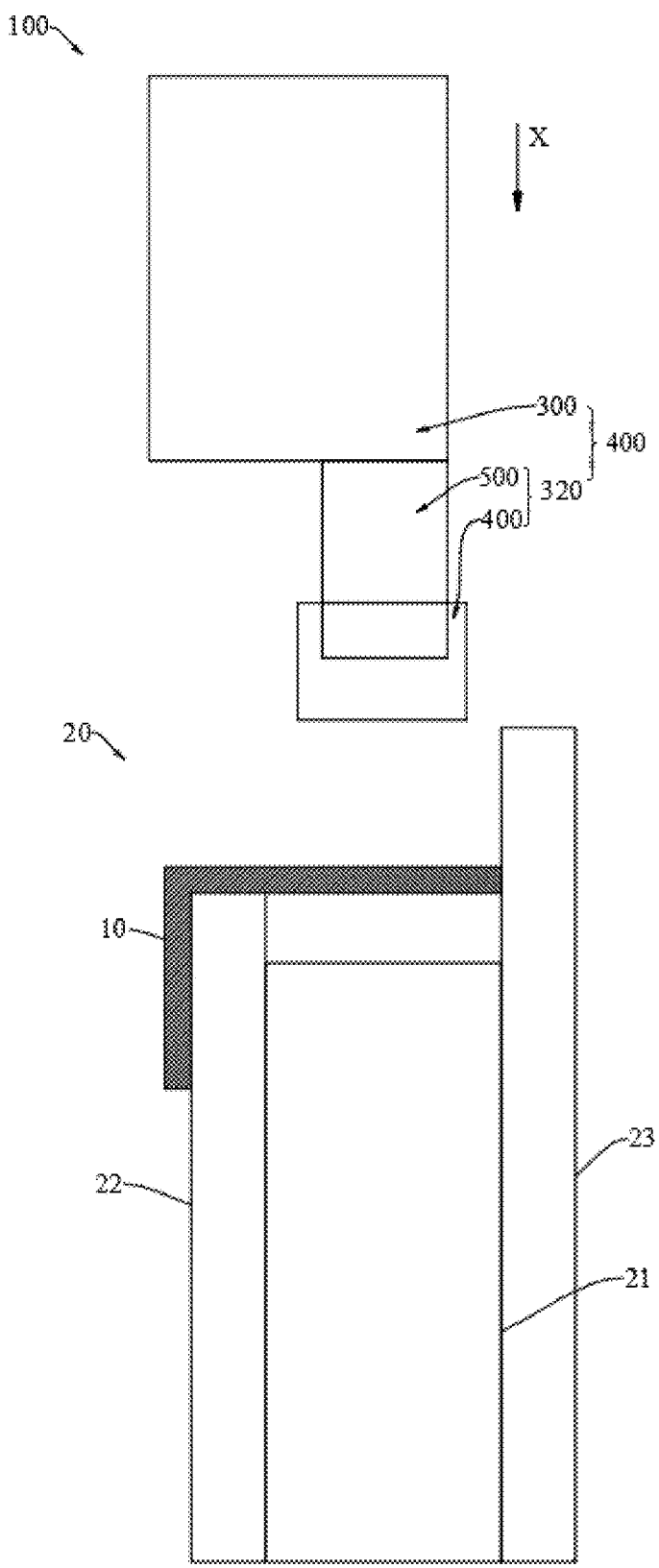
FIG. 9 is a schematic view of a first bonding method the bonding device provided by the embodiment of the present invention.

For example, with reference to FIG. 9, vertical bonding is to preferentially bond a sandwiched layer surface between the backlight module 22 and the cover plate 23. The roller is used to press the backlight surface to achieve an effect, and finally the squeeze sub-portion 320 is turned vertically and downward presses an end surface of the liquid crystal display panel 21 firmly. It is required that the light shielding adhesive completely covers the end surface of the liquid crystal display panel 21 and no gap is formed between the liquid crystal display panel 21 and the cover plate 23.

Figure 10:
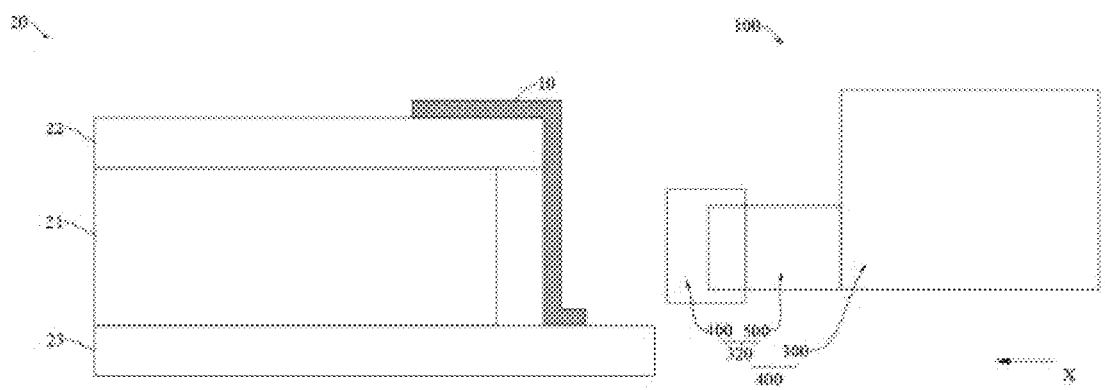
FIG. 10 is a schematic view of a second bonding method of the bonding device provided by the embodiment of the present invention.

For example, with reference to FIG. 10, lateral bonding is to preferentially bond the backlight surface. The roller presses a sandwiched layer surface between the backlight module 22 and the cover plate 23 to achieve an effect, and finally the squeeze sub-portion 320 is turned laterally and downward presses the end surface of the liquid crystal display panel 21 firmly. It is required that the light shielding adhesive completely covers the end surface of the liquid crystal display panel 21 and no gap is formed between the liquid crystal display panel 21 and the cover plate 23.

TABLE 5

|  | Vertical bonding 1 | Vertical bonding 2 | Vertical bonding 3 | Vertical bonding 4 | Lateral bonding 1 | Lateral bonding 2 |
| --- | --- | --- | --- | --- | --- | --- |
| Whether material obtaining is photographed? | Yes | No | No | No | No | No |
| Whether pre-bonding is photographed? | Yes | Yes | Yes | Yes | Yes | Yes |
| Whether the squeeze sub-portion 320 includes a flexible portion? | Yes | Yes | No | Yes | Yes | No |
| Pressing machine part | Silicone | PV glue | Polyurethane | Rubber | Hard glue | Pick material |
| Squeezing method | Perpendicular press by one time | planar reciprocal press by one time | Press by one time | Roll press by one time | Press by four times | Press by three times |
| yield rate/% | 98.5 | 97.6 | 91 | 90 | 75 | 93 |
| Effect | Excellent | Excellent | Normal | Normal | Normal | Poor |

With reference to Table 5, it presents inspections for different bonding methods. The method of lateral bonding 2 has a risk scratching the cover plate 23. Combining final effect and product yield rate, preferably, vertical bonding is selected as a bonding method.

The present invention, by using the squeeze sub-portion 320 of the lamination part 300 with a smaller width, more conveniently squeezes and bonds the adhesive layer 10, which facilitates mechanized bonding, improves a bonding efficiency and reduces a labor cost while guaranteeing a bonding effect.

The embodiment of the present invention discloses a bonding device. The bonding device includes a main body and a lamination part connected to the main body. The lamination part is configured to press and bond an adhesive layer to an apparatus to be bonded, and includes a lamination main portion and a squeeze sub-portion connected to the lamination main portion. Along a lamination direction perpendicular to the lamination part, a width of the squeeze sub-portion is less than a width of the lamination main portion. The present invention, by using the squeeze sub-portion of the lamination part with a smaller width, more conveniently squeezes and bonds the adhesive layer, which facilitates mechanized bonding, improves a bonding efficiency and reduces a labor cost while guaranteeing a bonding effect.

The bonding device provided by the embodiment of the present invention is described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A bonding device, comprising:
   a main body; and
   a lamination part connected to the main body and configured to press and bond an adhesive layer to an apparatus to be bonded;
   wherein the lamination part comprises a lamination main portion and a squeeze sub-portion connected to the lamination main portion, and along a lamination direction perpendicular to the lamination part, and a width of the squeeze sub-portion is less than a width of the lamination main portion;
   wherein the squeeze sub-portion comprises a flexible body and a connector connecting the flexible body and the lamination main portion, and the flexible body is disposed around an end of a side of the connector away from the lamination main portion; and an elastic modulus of the flexible body is less than an elastic modulus of the connector;
   wherein an outer surface of a side of the flexible body away from the connector is a spherical surface.

2. The bonding device according to claim 1, wherein the flexible body comprises a first portion and a second portion disposed oppositely, and an elastic modulus of the first portion is different from an elastic modulus of the second portion.

3. The bonding device according to claim 1, wherein the flexible body comprises a third portion and a fourth portion, the third portion is disposed on a side surface of an end portion of the connector, and the fourth portion is disposed on an end surface of an end portion of the connector; and
   a thickness of the third portion is less than a thickness of the fourth portion.

4. The bonding device according to claim 1, wherein
   the flexible body comprises a cavity, and the connector comprises a first via hole communicating with the cavity;
   the bonding device further comprises a pneumatic part; and
   the pneumatic part communicates with the cavity through the first via hole.

5. The bonding device according to claim 4, wherein
   the flexible body comprises a first sidewall and a second sidewall corresponding to the cavity, the first sidewall is located on a side of the second sidewall away from the connector; and
   an elastic modulus of the first sidewall is less than an elastic modulus of the second sidewall.

6. The bonding device according to claim 1, further comprising:
   an attaching part connected to the main body and comprising a roller portion configured to align and bond the adhesive layer to the apparatus to be bonded; and
   an alignment inspection part connected to the attaching part and comprising an optical inspection part configured to inspect an alignment bonding position of the adhesive layer and the apparatus to be bonded.

7. The bonding device according to claim 1, further comprising a coverage inspection part configured to inspect a coverage of the squeeze sub-portion to the adhesive layer.

8. The bonding device according to claim 1, further comprising a pressure inspection part connected to the lamination part.

9. A bonding device, comprising:
   a main body;
   a lamination part connected to the main body and configured to press and bond an adhesive layer to an apparatus to be bonded; and
   an attaching part connected to the main body and comprising a roller portion configured to align and bond the adhesive layer to the apparatus to be bonded;
   wherein the lamination part comprises a lamination main portion and a squeeze sub-portion connected to the lamination main portion, and along a lamination direction perpendicular to the lamination part, and a width of the squeeze sub-portion is less than a width of the lamination main portion;
   wherein the squeeze sub-portion comprises a flexible body and a connector connecting the flexible body and the lamination main portion, and the flexible body is disposed around an end of a side of the connector away from the lamination main portion; and an elastic modulus of the flexible body is less than an elastic modulus of the connector;
   wherein an outer surface of a side of the flexible body away from the connector is a spherical surface.

10. The bonding device according to claim 9, wherein the flexible body comprises a first portion and a second portion disposed oppositely, and an elastic modulus of the first portion is different from an elastic modulus of the second portion.

11. The bonding device according to claim 9, wherein
    the flexible body comprises a third portion and a fourth portion, the third portion is disposed on a side surface of an end portion of the connector, and the fourth portion is disposed on an end surface of an end portion of the connector; and a thickness of the third portion is less than a thickness of the fourth portion.

12. The bonding device according to claim 9, wherein the flexible body comprises a cavity, and the connector comprises a first via hole communicating with the cavity;

the bonding device further comprises a pneumatic part; and the pneumatic part communicates with the cavity through the first via hole.

13. The bonding device according to claim 12, wherein the flexible body comprises a first sidewall and a second sidewall corresponding to the cavity, the first sidewall is located on a side of the second sidewall away from the connector; and an elastic modulus of the first sidewall is less than an elastic modulus of the second sidewall.

14. The bonding device according to claim 9, further comprising a coverage inspection part configured to inspect a coverage of the squeeze sub-portion to the adhesive layer.

15. The bonding device according to claim 9, further comprising a pressure inspection part connected to the lamination part.

16. The bonding device according to claim 14, further comprising an alignment inspection part connected to the attaching part and comprising an optical inspection part configured to inspect an alignment bonding position of the adhesive layer and the apparatus to be bonded.

* * * * *